United States Patent [19]
DeTroye

[11] Patent Number: 4,748,581
[45] Date of Patent: May 31, 1988

[54] DIGITAL ROOT EXTRACTION CIRCUIT

[75] Inventor: Nicholaas C. DeTroye, Eindhoven, Netherlands

[73] Assignee: U.S. Philips Corp., New York, N.Y.

[21] Appl. No.: 770,548

[22] Filed: Aug. 29, 1985

[30] Foreign Application Priority Data

Sep. 7, 1984 [NL] Netherlands ............... 8402740

[51] Int. Cl.$^4$ ............................................. G06F 7/552
[52] U.S. Cl. ................................................... 364/752
[58] Field of Search ............................. 364/752, 814

[56] References Cited

U.S. PATENT DOCUMENTS 3,906,210  9/1975  Mignot ............................. 364/752

FOREIGN PATENT DOCUMENTS 0809174  3/1981  U.S.S.R. ........................... 364/752
1111155  8/1984  U.S.S.R. ........................... 364/752
1148027  3/1985  U.S.S.R. ........................... 364/752

OTHER PUBLICATIONS

Majithia, "Nonrestoring Binary Division Using a Cellular Array", Electronics Letters, 14th May 1970, vol. 6, No. 10, pp. 303–304.
Majithia et al, "A Cellular Array for the Nonrestoring Extraction of Square Roots", IEEE Trans. on Computer, Dec. 1971, pp. 1617–1618.
Majithia, "Cellular Array for Extraction of Squares and Square Roots of Binary Numbers", IEEE Trans. on Computer, Sep. 1972, pp. 1023–1024.
Guild, "Cellular Logical Array for Nonrestoring Square-Root Extraction", Electronics Letters, 5th Feb. 1970, vol. 6, No. 3, pp. 66–67.
Devries et al, "Fully Iterative Array for Extracting Square Roots", Electronics Letters, 16th Apr. 1970, vol. 6, No. 8, pp. 255–256.
Agrawal, "High-Speed Arithmetic Arrays", IEEE Trans. on Computers, vol. C-28, No. 3, Mar. 1979, pp. 215–224.
Kwange, "Computer Arithmetic: Principles, Architecture, and Design", published by John Wiley & Sons, 1979, pp. 360–362 and 42–43.

Primary Examiner—Gary V. Harkcom
Assistant Examiner—Tan V. Mai
Attorney, Agent, or Firm—Thomas A. Briody; Jack Oisher

[57] ABSTRACT

A circuit for extracting the square root of a 2n-bit input binary number. The circuit comprises n successive subcircuits, the $m^{th}$ such subcircuit consisting of (m+1) add/subtract cells, where $1 \leq m \leq n$. The successive subcircuits process successively less significant pairs of bits of the input number, such bits respectively being received on a data input of two respective add/subtract cells in each subcircuit. Such cells receive a logic bit "1" on a second data input and a logic "0" on a control input thereof, and so always operate in the addition mode. The remaining add/subtract cells of any $m^{th}$ subcircuit are controlled by the carry signal which constitutes the output of the $(m-1)^{th}$ subcircuit. The root extraction circuit thereby effects subtraction by 2's complement addition, avoiding the need for inversion of any data input signals. That achieves a completely regular circuit pattern permitting more efficient use of chip area when the circuit is realized in integrated form.

1 Claim, 1 Drawing Sheet

DIGITAL ROOT EXTRACTION CIRCUIT

BACKGROUND OF THE INVENTION

1. Field of the Invention

The invention relates to a digital root extraction circuit for determining the square root of a 2n-bit binary number, the bit significance thereof decreasing from the first to the $2n^{th}$ bit, which circuit comprises a logic array of controllable add/subtract cells (CAS cells) each of which comprises a first and a second data input, a control input, a carry signal input, a carry signal output and a sum signal output. The root extraction circuit comprises n sub-circuits, an $m^{th}$ sub-circuit thereof comprising m+1 CAS cells, where $1 \leq m \leq n$. The carry signal output of a CAS cell for the processing of bit signals of a given significance is connected to the carry signal input of a CAS cell for the processing of bit signals of a next higher significance, the carry signal output of the first CAS cell in any $m^{th}$ sub-circuit forming an $m^{th}$ output of the root extraction circuit for an output bit having a significance m. A first data input of the $(m-i)^{th}$ CAS cell in the $m^{th}$ sub-circuit is connected to the $(m-i)^{th}$ output of the root extraction circuit, where $1 \leq i \leq m$, a second data input of such $(m-i)^{th}$ CAS cell being connected to the sum signal output of the $m^{th}$ CAS cell in the $(m-1)^{th}$ sub-circuit. The control input of at least the CAS cells in an $m^{th}$ sub-circuit whose first data inputs are connected to a sum signal output of a CAS cell of an $(m-1)^{th}$ sub-circuit, are connected to the $(m-1)^{th}$ output of the root extraction circuit. The $m^{th}$ and $m+1^{th}$ CAS cells of an $m^{th}$ sub-circuit receive bit signals having a significance $2m-1$ and $2m$, respectively, on their first data input, the control input of the $m+1^{th}$ CAS cell being connected to its carry signal input.

1. Description of the Related Art

A root extraction circuit of this kind is known from the book "Computer Arithmetic: Principles, Architecture and Design", by Kai Hwang, published by John Wiley & Sons. The root extraction circuit is shown and described in chapter 11, section 2, pages 360-2 (FIG. 11.2), and is realised by means of so-called controllable add/subtract cells (CAS cells) which are shown (FIG. 2.10) and described in the same book in chapter 2, section 3, pages 42-3. The construction of the root extraction circuit is based on an algorithm which is described on said pages 360-2; according to this algorithm, signals must be inverted in some locations in the root extraction circuit before they can be applied to a CAS cell. However, the inverter circuits required for inverting the signals disturb the regular pattern of the CAS cells which would be feasible if only CAS cells were integrated. The fact that the inverter circuits are required and that they disturb a feasible regular pattern for integration is found to be very disadvantageous.

SUMMARY OF THE INVENTION

It is the object of the invention to provide a root extraction circuit which does not require inverter circuits and in which no circuits are required other than the CAS cells.

To this end, a root extraction circuit in accordance with the invention is characterized in that in each $m^{th}$ sub-circuit the two CAS cells for the processing of the bit signals having the signigicance $(2m-2)$ and $2m$ receive the binary value 1 (one) on their first data input and the binary value 0 (zero) on their control input. The root extraction circuit in accordance with the invention does not require inverter circuits or other circuits for extracting the root of a binary number, thus allowing for a very regular pattern of CAS cells to be obtained when the root extraction circuit in accordance with the invention is integrated on a semiconductor substrate.

BRIEF DESCRIPTION OF THE DRAWINGS

An embodiment in accordance with the invention will be described in detail hereinafter with reference to the accompanying drawings; therein.

DESCRIPTION OF THE PREFERRED EMBODIMENTS

Figure 1:
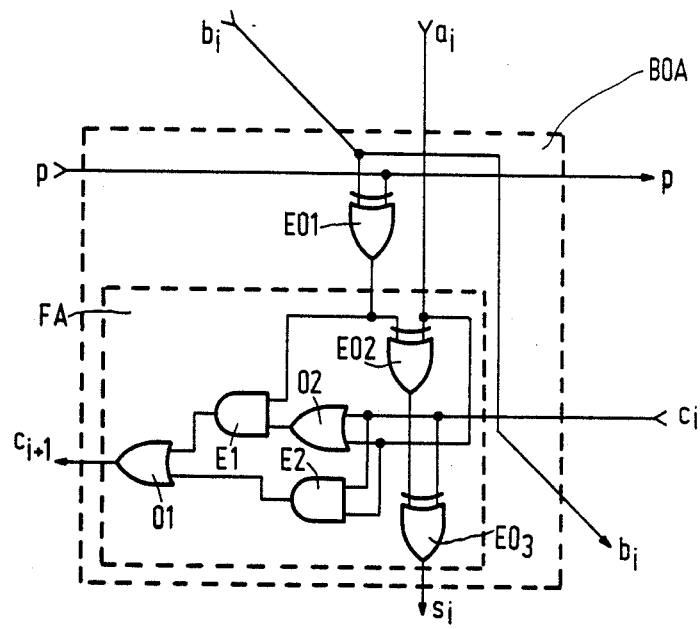
FIG. 1 shows a known controllable add/subtract cell.

The known controllable add/subtract circuit BOA shown in FIG. 1 includes a full-adder ciruit FA and a further exclusive OR-gate E01. The full-adder circuit FA comprises a second and a third exclusive OR-gate E02 and E03, respectively, a first and second AND-gate, E1 and E2, respectively, and a first and a second OR-gate, 01 and 02, respectively. The circuit BOA receives four signals $a_i$, $b_i$, $c_i$ and p which represent a first and a second binary signal to be processed, a carry signal and a control signal, respectively. When the control signal p is a logic "zero", the circuit BOA operates as a full adder circuit. When the signal p is a logic "one", the circuit BOA operates as a subtract circuit, the signals $c_{i+1}$ and $c_i$ then meaning "borrow-in" and "borrow-out". The relation between input signals and output signals of the circuit BOA can be expressed in the following Boolean equation:

$$s_i = a_i \oplus (b_i \oplus p) \oplus c_i$$

$$c_{i+1} = (a_i + c_i).(b_i \oplus p) + a_i.c_i.$$

Figure 2:
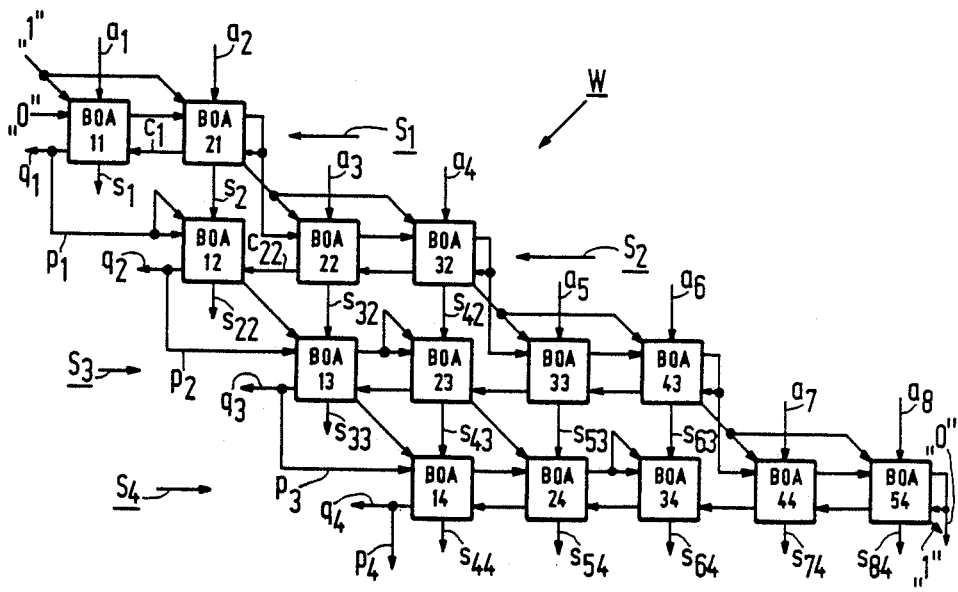
FIG. 2 shows a root extraction circuit in accordance with the invention.

FIG. 2 shows a root extraction circuit W in accordance with the invention which is composed of a number of sub-circuits S1, S2, S3 and S4 which include 2, 3, 4 and 5 controllable add/subtract cells BOA, respectively. For the sake of clarity it is to be noted that the signal inputs and outputs of each add/subtract circuit $BOA_{ij}$ ($1 \leq j \leq 4$; $i \leq j+1$) are always shown in the same location and the same orientation as shown approximately in FIG. 1 and in the same way in said literature. In accordance with the invention all circuits BOA11, 21, 22, 32, 33, 43, 44, 54, which receive a binary signal representing an input bit on the signal input $a_i$, receive a binary signal having the logic value "1" (one) on their input for the signal $b_i$, and the logic value "0" (zero) on their control input (for the signal p). The outputs $q_1$, $q_2$, $q_3$ and $q_4$ form the carry signal outputs of the circuits BOA 11, 12, 13, 14 and constitute the output of the root extraction circuit W. On the outputs $q_1$ to $q_4$ the root $0.q_1q_2q_3q_4$ is obtained of a binary number $0.a_1a_2a_3a_4a_5a_6a_7a_8$ presented to the circuit W.

As described in said publication, the number 0.01 is subtracted from the number combination $0.a_1a_2$ during a first operation when the square root is extracted of a binary number $A = 0.a_1a_2a_3 \ldots a_{2n}$. When the remainder $R_1$ is positive, $q_1 = 1$ and the binary number $0.q_101$ is subtracted from the combination $0.R_1a_3a_4$. When the remainder $R_1$ is negative, $q_1 = 0$ and the binary $0.q_111$ is added to the combination $R_1a_3a_4$. It can be deduced that for a $k^{th}$ step the following calculations are required for determining the $k^{th}$ bit of the square root of the number A.

$$R_{k+1} = 0.R_k \cdot a_{2k+1} \cdot a_{2k+2} - 0.\bar{q}_1\bar{q}_2 \ldots \bar{q}_k 01; \text{ if } q_i = 1$$

$$R_{k+1} = 0.R_k \cdot a_{2k+1} \cdot a_{2k+2} + 0.q_1q_2 \ldots q_k 11; \text{ if } q_k = 0$$

The foregoing means that, depending on the last bit $q_k$ of the root found, either an addition or a subtraction must take place. The first formula ($q_k = 1$, so that a subtraction must be performed) can be rewritten, however, in the two's-complement notation as:

$$R_{k+1} = 0.R_k \cdot a_{2k+1} \cdot a_{2k+2} + 0.q_1 \cdot q_2 \ldots q_k 11 \ (q_k - 1)$$

Further it still holds that:

$$R_{k+1} = 0.R_k \cdot a_{2k+1} \cdot a_{2k+2} + 0.q_1 q_2 \ldots q_k 11 \ (q_k = 0)$$

It can be understood from the above two formulas that the two add/subtract cells BOA ($2k+2$, $2k+3$) of a sub-circuit ($k+1$) always receive a logic signal "1" on their "b" signal input, that the control signal inputs always receive a logic signal "0" (these cells BOA must always add), and that the remaining add/subtract cells BOA of a sub-circuit are controlled by the last bit $q_k$ formed (of the root to be determined) from the preceding sub-circuit k.

What is claimed is:

1. An improved circuit for extracting the square root of an input binary number of 2n bits which are in descending order of significance, such square root being an output binary number of n bits in descending order of significance, such circuit comprising:
    a plurality of controllable add/subtract cells each having a first data input ($a_i$), a second data input ($b_i$), a control input (p), a carry/borrow input ($C_i$), a carry/borrow output ($C_{i+1}$), and a sum/difference output ($S_i$), each such cell being controlled by a control signal bit at its control input (p) to select whether said cell adds or subtracts data bits at its first and second data inputs;
    a plurality n of successive subcircuits which respectively process progressively less significant pairs of bits of the input binary number, the $m^{th}$ of such subcircuits comprising a succession of (m+1) of said cells, where $1 \leq m \leq n$; the $m^{th}$ and $(m+1)^{th}$ of such cells respectively receiving on their first data input ($a_i$) data bits of the input binary number of significance (2m−1) and (2m); the carry/borrow output ($C_i+1$) of each cell in the $m^{th}$ subcircuit being connected to the carry/borrow input ($C_i$) of the preceding cell in such subcircuit, the carry/borrow output of the first of such cells constituting the $m^{th}$ significant bit of the output binary number produced by the root extraction circuit; the control input (p) of the first cell in the mth subcircuit being connected to the $(m−1)^{th}$ output of the root extraction circuit; the first data bit input ($a_i$) of such first cell being connected to the sum/difference output ($S_i$) of the second cell in the $(m−1)^{th}$ subcircuit; and the control input (p) of the $(m+1)^{th}$ cell in the $m^{th}$ subcircuit being connected to the carry/borrow input ($C_1$) of such cell;
    such improvement being characterized in that:
    a binary "1" bit is maintained at the second data bit input ($b_i$) of the first cell in the first subcircuit, and in any $m^{th}$ subcircuit the second data bit input ($b_i$) of the $m^{th}$ and $(m+1)^{th}$ cells are both connected to the second data bit input ($b_i$) of the last cell in the $(m−1)^{th}$ subcircuit, whereby all $m^{th}$ and $(m+1)^{th}$ cells always receive a binary "1" bit on their second data inputs ($b_i$);
    a binary "0" bit is maintained at the control input (p) of the first cell in the first subcircuit, and in any $m^{th}$ subcircuit the control input (p) of the $m^{th}$ and $(m+1)^{th}$ cells are connected to the control input (p) of the last cell in the $(m−1)^{th}$ subcircuit, whereby all of the $m^{th}$ and $(m+1)^{th}$ cells always receive a binary "0" on their control inputs (p); and
    in any $m^{th}$ subcircuit, the second data input ($b_i$) of the $(m−1)^{th}$ cell is connected to the control input (p) of such cell and the control input (p) of all cells other than the $m^{th}$ and $(m+1)^{th}$ cells are connected to the $(m−1)^{th}$ output of the root extraction circuit;
    whereby the square root of the input binary number is extracted without inverting any bits on any inputs of any of said cells.

* * * * *